United States Patent [19]
Bell et al.

[11] Patent Number: 6,121,707
[45] Date of Patent: Sep. 19, 2000

[54] ELECTRIC MOTOR AND ELECTRIC MOTOR STATOR AND METHOD FOR MAKING SAME

[75] Inventors: Sidney Bell, Athens; Jerry L. Martin; Grayson W. Lambert, Jr., both of Gainesville, all of Ga.

[73] Assignee: Reliance Electric Technologies, LLC, Thousand Oaks, Calif.

[21] Appl. No.: 09/010,797

[22] Filed: Jan. 22, 1998

[51] Int. Cl.[7] .............................. H02K 3/04; H02K 3/12
[52] U.S. Cl. ..................... 310/179; 310/184; 310/196; 310/260
[58] Field of Search ................... 310/203, 171, 310/180, 184, 193, 196, 201, 208, 260; 335/299; 336/223

[56] References Cited

U.S. PATENT DOCUMENTS

| | | | |
|---|---|---|---|
| 473,618 | 4/1892 | Eickemeyer | 310/208 |
| 555,850 | 3/1896 | Cushman | 310/208 |
| 1,834,923 | 12/1931 | Apple | 310/201 |
| 2,407,935 | 9/1946 | Perfetti | 310/201 |
| 4,200,818 | 4/1980 | Ruffing et al. | 310/214 |

FOREIGN PATENT DOCUMENTS

| | | | |
|---|---|---|---|
| 57-003540 | 1/1982 | Japan | 310/208 |

OTHER PUBLICATIONS

Winding Alternating–Current Machines, Liwschitz–Garik, p. 11, 1950.

Armature WInding and Motor Repair, Braymer, p. 50, 51, 1920.

Translation of Japanese Patent, 57–003540, Jan. 9, 1982.

Robert Rosenberg, "Electric Motor Repair" Second Edition, Chapter 4 (excerpts), Brooklyn, New York, 1989.

B.A. Behrend, "The Induction Motor and Other Alternating Current Motors," Second Edition, pp. 179–181, 1921.

*Primary Examiner*—Nestor Ramirez
*Assistant Examiner*—Karl E. I. Tamai
*Attorney, Agent, or Firm*—Patrick S. Yoder; John J. Horn; William R. Walbrun

[57] ABSTRACT

A technique for forming stator coils for an electric motor is disclosed. The technique includes forming D-shaped or generally trapezoidal coils having a closed loop defining a long side and a short side joined by end portions. The coils are installed in a stator core having a plurality of slots formed around its inner periphery. The long sides of the coils are disposed in a predetermined position within these slots, such as in a lower position, while the short sides are disposed in opposite positions, such as in upper positions. The long sides extend beyond the short sides at end regions of the stator core. The end portions of each coil wrap around the ends of the stator core and incline from the long side of the respective coil to the short side thereof. Crossing points are established between the long side of each coil and end portions of adjacent coils. The crossing points are located in predetermined positions and the coils may be taped to insulate the long sides from the end portions at the locations of the crossing points. The physical spacing of the end portions owing to the trapezoidal shape of the coils reduces potential difference gradients between the coils, reducing the risk of corona breakdown in inverter drive applications and the like.

18 Claims, 5 Drawing Sheets

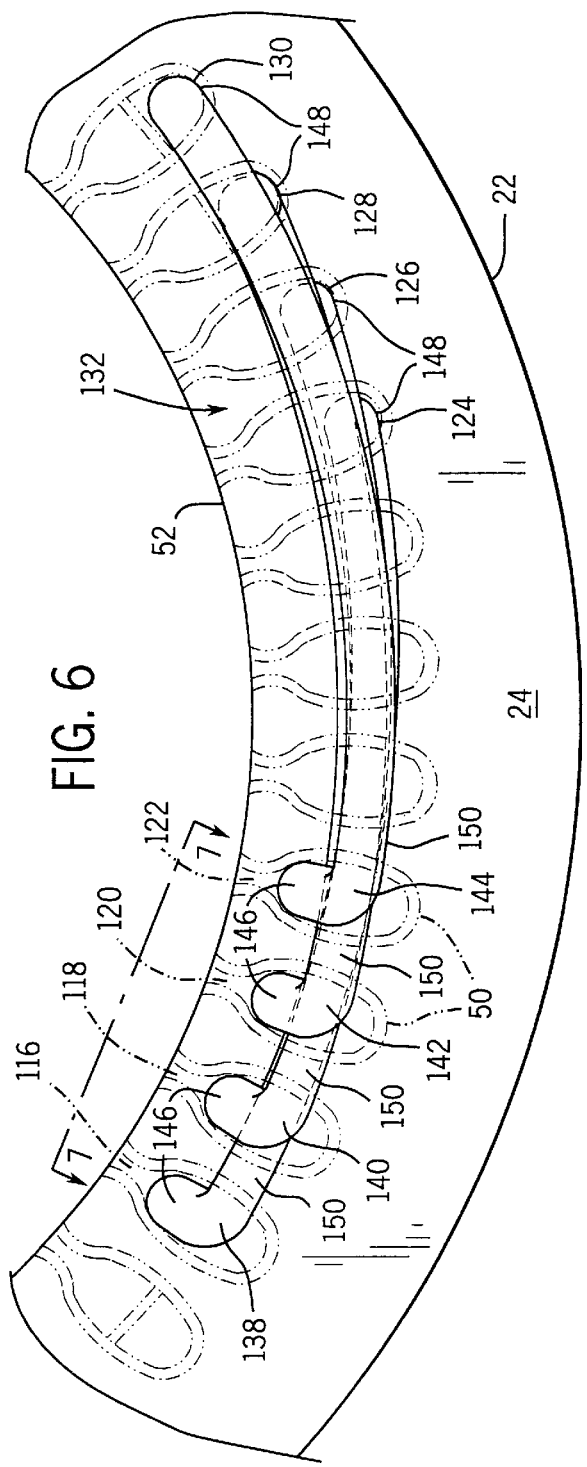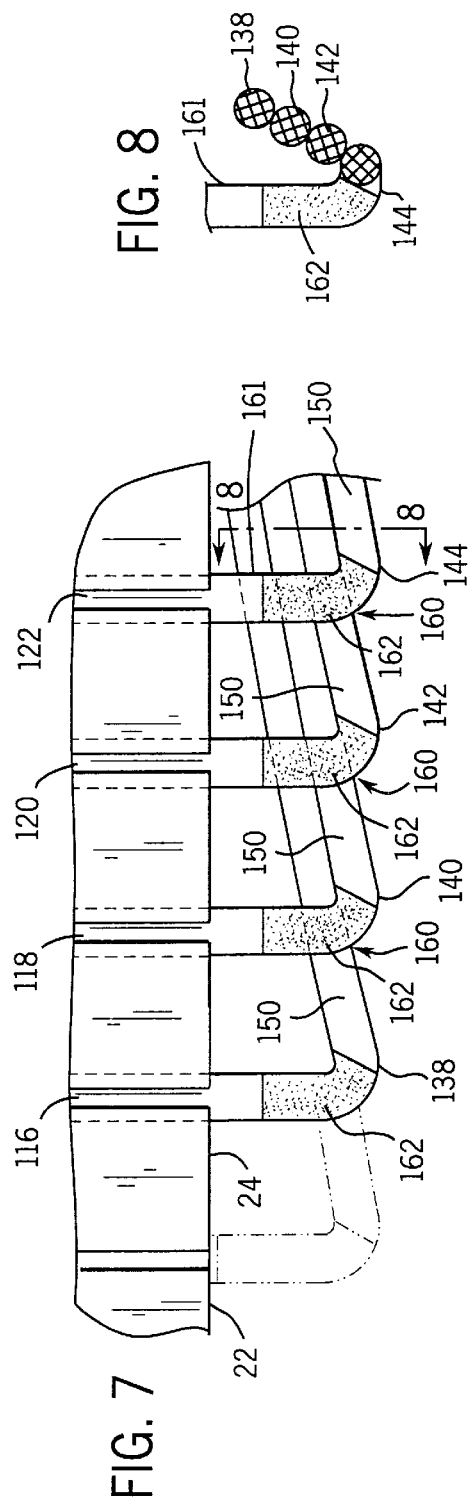

ELECTRIC MOTOR AND ELECTRIC MOTOR STATOR AND METHOD FOR MAKING SAME

BACKGROUND OF THE INVENTION

1. Field of the Invention

The present invention relates generally to the field of electric motors and stator windings for such motors. More particularly, the invention relates to a novel technique for forming coils for electric motor stators and for installing and interconnecting a multiplicity of such coils in an electric motor.

2. Description of the Related Art

Electric motors of various types are omnipresent in industrial, commercial and consumer settings. In industry, such motors are employed to power all types of rotating machinery, such as pumps, conveyors, compressors, fans and so forth, to mention only a few. Conventional alternating current electric motors may be constructed for single or multiple phase operation, and are typically specifically designed to operate at predetermined synchronous speeds, such as 3600 rpm, 1800 rpm, 1200 rpm and so on. Such motors generally include a stator, comprising a multiplicity of coils, surrounding a rotor which is supported by bearings for rotation in the motor frame. Alternating current power applied to the motor causes the rotor to rotate within the stator at a speed which is a function of the frequency of alternating current input power and of the motor design (i.e., the number of poles defined by the motor windings and rotor resistance). The rotor shaft extends through the motor housing and is connected to elements of the machinery driven by the electric motor.

In conventional alternating current electric motors, stator winding coils are disposed in parallel slots formed around the inner periphery of a stator core. Certain of the winding coils are electrically connected in groups around the stator core to establish the desired electromagnetic fields used to induce rotation of the rotor. The number and locations of the windings in the stator core generally depends upon the design of the motor (e.g., the number of poles, the number of stator slots, the number of winding groups, and so forth). For example, one common stator design for a four-pole, three-phase motor includes 48 stator slots in which 12 groups of windings are installed, each group consisting of 4 coils.

Each stator winding coil is typically preformed in a diamond, elongated hexagonal or in an oval shape and pressed into the appropriate slots during assembly of the stator. Each winding coil includes a number of turns of wire which loop around end or head regions of the stator between the slots in which the winding coil is installed. Following installation in the slots, the coils in each group are generally pressed into a bundle at either end of the stator, and sheet insulating material is provided between power phase windings. Once complete, the entire assembly is packaged and varnished to bond and environmentally protect the winding. The varnish displaces the air between the coils and, in effect, reduces the risk of ionization.

While conventional motor stators and motors incorporating such stators function well in many applications, they are not without drawbacks. In particular, such stators may encounter problems in an increasing number of industrial applications wherein motor drive circuitry includes electronic inverter circuits, such as in variable frequency AC drives. Such inverter circuits are useful for varying the frequency of the electrical power used to drive the motors, and hence, their driven speed.

As inverter drives have been improved over the years, extremely rapid inverter switching has been attained which aids in providing precisely controlled wave forms, but which can result in periods of very high potential difference between stator winding coils. The magnitude of these potential differences depends upon the stator configuration. For example, for the four-pole, three-phase, 48 slot stator, having 12 groups of 4 winding coils, mentioned above, when the windings are coupled in a wye configuration, each coil experiences a voltage drop of only 1.717 times the line voltage, divided by 16. If however, the winding groups are connected in a delta configuration, each coil experiences twice that voltage drop. If the 4 coils in each group are coupled in parallel in the delta configuration, as may sometimes be required, each group will experience a total voltage drop equal to the line voltage. When coupled to an inverter drive, the potential difference between grouped coils in the stator may, during transient operating periods, rise as high as three times the inverter drive bus voltage due, in part, to a reflected wave phenomena resulting from the very high switching rates of the inverter circuit components and inverter drive-to-motor lengths. Thus, for inverter drives having a direct current bus voltage of approximately 650 volts, transient potential differences experienced between certain coils in the groups may rise as high as 1,950 volts. Under such conditions, conventional stator windings having grouped coils pressed into a bundle at the stator ends may be severely degraded by corona ionization resulting from the intense field gradients induced by these high voltages. Such ionization may lead to breakdown of the insulation wire enamel between the coil windings ultimately reducing the life of the motor.

There is a need, therefore, for an improved technique for forming electric motor stators which is effective in limiting the adverse effects of high potential differences between the stator windings, particularly for inverter drive applications. Moreover, there is a need for a technique which is capable of physically and electrically isolating stator windings from one another sufficiently to avoid corona ionization and the consequent degradation of the windings and insulation that ultimately results.

SUMMARY OF THE INVENTION

The invention provides a novel approach to forming stator windings and stators designed to respond to these needs. The technique can be employed in various motor configurations including in motors configured with 2, 4, 6 or more poles, for single or multiple phase operation, and from fractional horsepowers to very large power ratings. The technique is based on the formation of a generally D-shaped or trapezoidal coil having one side longer than the other. The long and short sides are laid into radially spaced slots around the inner periphery of the motor stator. The elongated side of each coil permits the coil to be overlapped with subsequent coils in a group, passing immediately adjacent to only one other coil as it exits its slot on either end of the stator core. The coils are thus physically spaced from one another in the group, with the exception of the immediately adjacent coil overlap. Overlapping coils can be insulated from one another easily, such as by taping one or the other coil at the point of overlap. The points of overlap are predictably located on the coil such that tape may be applied during winding of the coil, prior to installation in the stator slots. Once assembled, groups of coils may be insulated from one another via conventional insulation techniques. In multiphase machines, phase windings may be separated from one another by similar phase insulating techniques. Once varnished, windings in the completed stator are physically and electrically isolated from one another sufficiently to avoid harmful corona ionization, even in very high speed inverter drive applications.

Thus, in accordance with the first aspect of the invention, a coil is provided for an electric motor stator of the type including a generally annular stator core having ends and a plurality of radially spaced slots extending between the ends. The slots are configured for receiving a plurality of coils electrically interconnected in groups. Each coil includes a first terminal end, a second terminal end, and a plurality of windings extending between the first and second terminal ends. The windings form a closed loop having a first side of a first length and a second side of a second length greater than the first length. A pair of end portions extend between the first and second sides of the loop. The first and second sides are configured for placement in first and second non-adjacent slots of the stator core, respectively. Thus, when the coil is installed in the stator core the first side extends beyond the core ends by a first amount, while the second side extends beyond the core ends by a second amount greater than the first amount.

In accordance with another aspect of the invention, a stator for an electric motor includes a generally annular stator core, and a plurality of coils. The stator core has first and second ends, and a plurality of radially spaced elongated slots extending therebetween. The coils are electrically interconnected to form groups of coils. Each coil includes a plurality of windings forming a loop having a first side of first length, a second side of second length greater than the first length, and a pair of end portions extending between the first and second sides. The first and second sides of each coil are disposed in non-adjacent stator core slots. The second side of each coil crosses end portions of another coil disposed in an adjacent stator core slot in locations axially exterior of the stator core ends. In a particularly preferred configuration, the second side of each coil is insulated in the locations adjacent to the end portions thereof where the second side crosses the end portion of the adjacent coil.

In accordance with still another aspect of the invention, an electric motor is provided that includes a housing, a rotor and a stator. The rotor is supported for rotation in the housing and includes an output shaft for transmitting torque. The stator is also disposed in the housing and surrounds the rotor. The stator includes a generally annular stator core having first and second ends, and a plurality of radially spaced elongated slots extending between the ends. A plurality of coils are electrically interconnected to form groups of coils. Each coil includes a plurality of windings forming a loop having a first side of a first length, a second side of a second length longer than the first length, and a pair of end portions extending therebetween. The first and second sides of each coil are disposed in non-adjacent stator core slots. The second side of each coil crosses end portions of another coil disposed in an adjacent stator core slot in locations axially exterior of the stator core ends.

The invention also provides a method for forming an electric motor stator. The method begins with providing a generally annular stator core having a pair of ends and a plurality of radially spaced elongated slots extending therebetween. A plurality of stator coils are formed, with each coil comprising a pair of terminal ends coupled to a generally trapezoidal loop having a short side, a long side and a pair of end portions extending therebetween. The coils are placed in the core slots such that the short side of a first coil is disposed in a first region of each slot and the long side of a second coil is disposed in a second region of each slot. A long and a short side of first and second coils are thus disposed in each slot. The long sides of the coils extend beyond the core ends by a greater distance than the short sides of the coils such that each long coil side crosses end portions at least one adjacent coil. Terminal ends of the coils are then interconnected to form groups of coils. In accordance with a particularly preferred embodiment, the long sides of the coils are insulated, such as with insulating tape, to isolate the long side from the end portions of the adjacent coils that it crosses.

BRIEF DESCRIPTION OF THE DRAWINGS

The foregoing and other advantages and features of the invention will become apparent upon reading the following detailed description and upon reference to the drawings in which:

FIG. 6 is an end view of a portion of a stator incorporating a series of coils of the type illustrated in FIG. 5 during installation of the coils;

FIG. 7 is a detail view of a portion of the stator illustrated in FIG. 6, showing a preferred configuration for routing the stator coils at each end of the stator core; and FIG. 8 is a detail sectional view of the coils shown in FIG. 7 along line 8—8, illustrating the manner in which the coils are stacked and insulated from one another at each end of the stator core.

DETAILED DESCRIPTION OF SPECIFIC EMBODIMENTS

Figure 1:
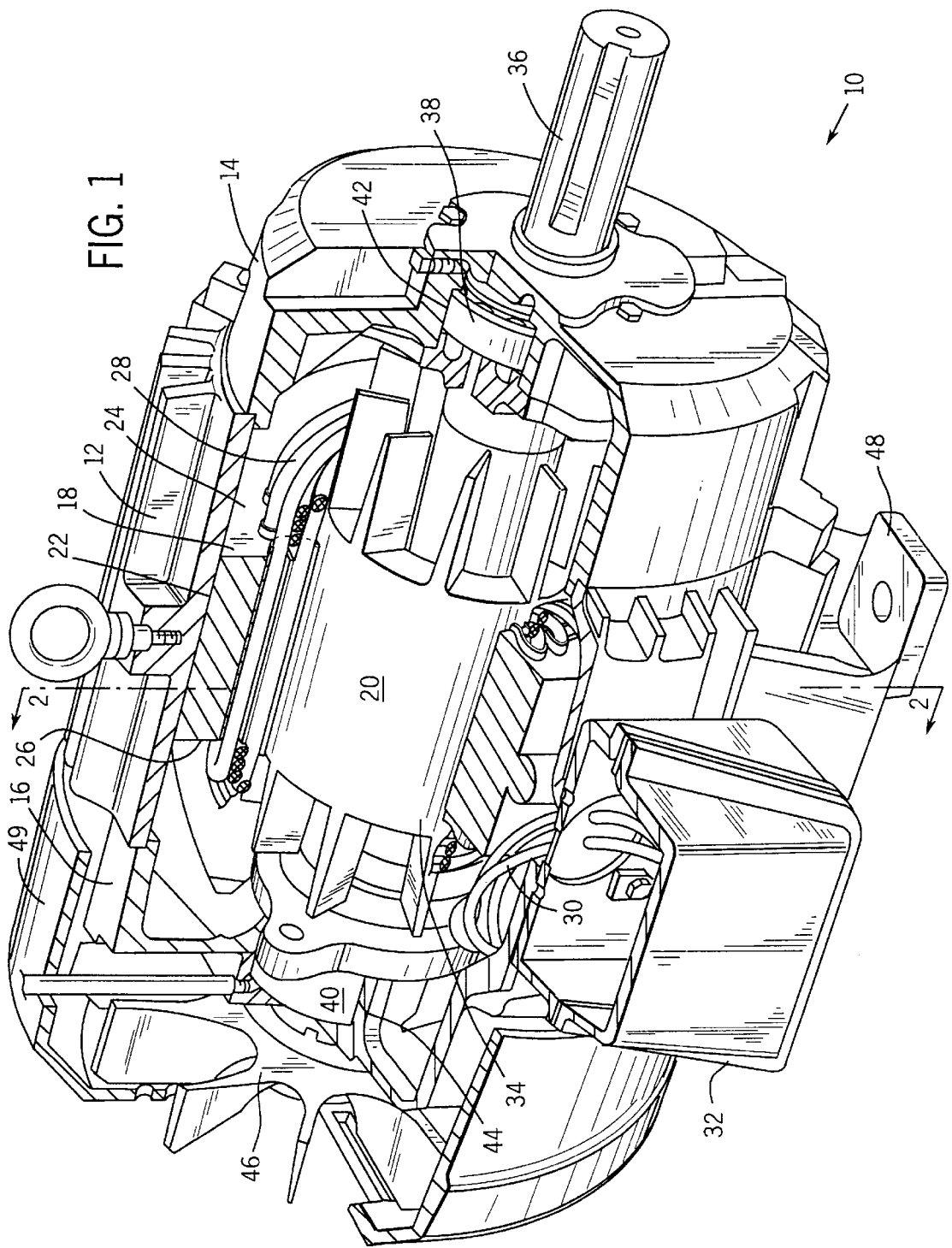
FIG. 1 is a partially sectioned perspective view of an alternating current electric motor illustrating the various functional components of the motor including a rotor and a stator, in accordance with certain aspects of the invention.

Turning now to the drawings, and referring first to FIG. 1, an electric motor is shown and designated generally by the reference numeral 10. Motor 10 may be of any suitable type capable of employing the stator winding configuration described in greater detail below. In the embodiment illustrated in FIG. 1, motor 10 is three-phase induction motor housed in a conventional NEMA enclosure. Accordingly, motor 10 includes a housing 12 open at front and rear ends and capped by a front end cap 14 and a rear end cap 16. Within housing 12 motor 10 includes a stator assembly 18 and a rotor assembly 20. Stator assembly 18 further comprises a stator core 22 having a front end 24, a rear end 26, and a plurality of stator windings 28 disposed within the core as described in greater detail below. Stator windings 28 are electrically interconnected to form groups, and the groups are, in turn, interconnected to form three phase windings.

The windings are further coupled to terminal leads 30 for electrically connecting motor 10 to a source of alternating current electrical power. Leads 30 terminate in a junction box 32 in which the necessary electrical connections can be made.

Rotor assembly 20 essentially comprises a cast rotor 34 supported on a rotary shaft 36. As will be appreciated by those skilled in the art, shaft 36 is configured for coupling to a driven machine element (not shown), for transmitting torque to the machine element. Rotor 34 and shaft 36 are supported for rotation within housing 12 by a front bearing set 38 and a rear bearing set 40, carried by front end cap 14 and rear end cap 16, respectively. To receive and support bearing sets 38 and 40, front end cap 14 forms a bearing support recess 42, while rear end cap 16 forms a similar bearing support recess 44. A cooling fan 46 is disposed within a fan cover 49, and is supported for rotation on shaft 36 to promote convective heat transfer through housing 12. Housing 12 generally includes features permitting it to be mounted in a desired application, such as integral mounting feet 48.

Figure 2:
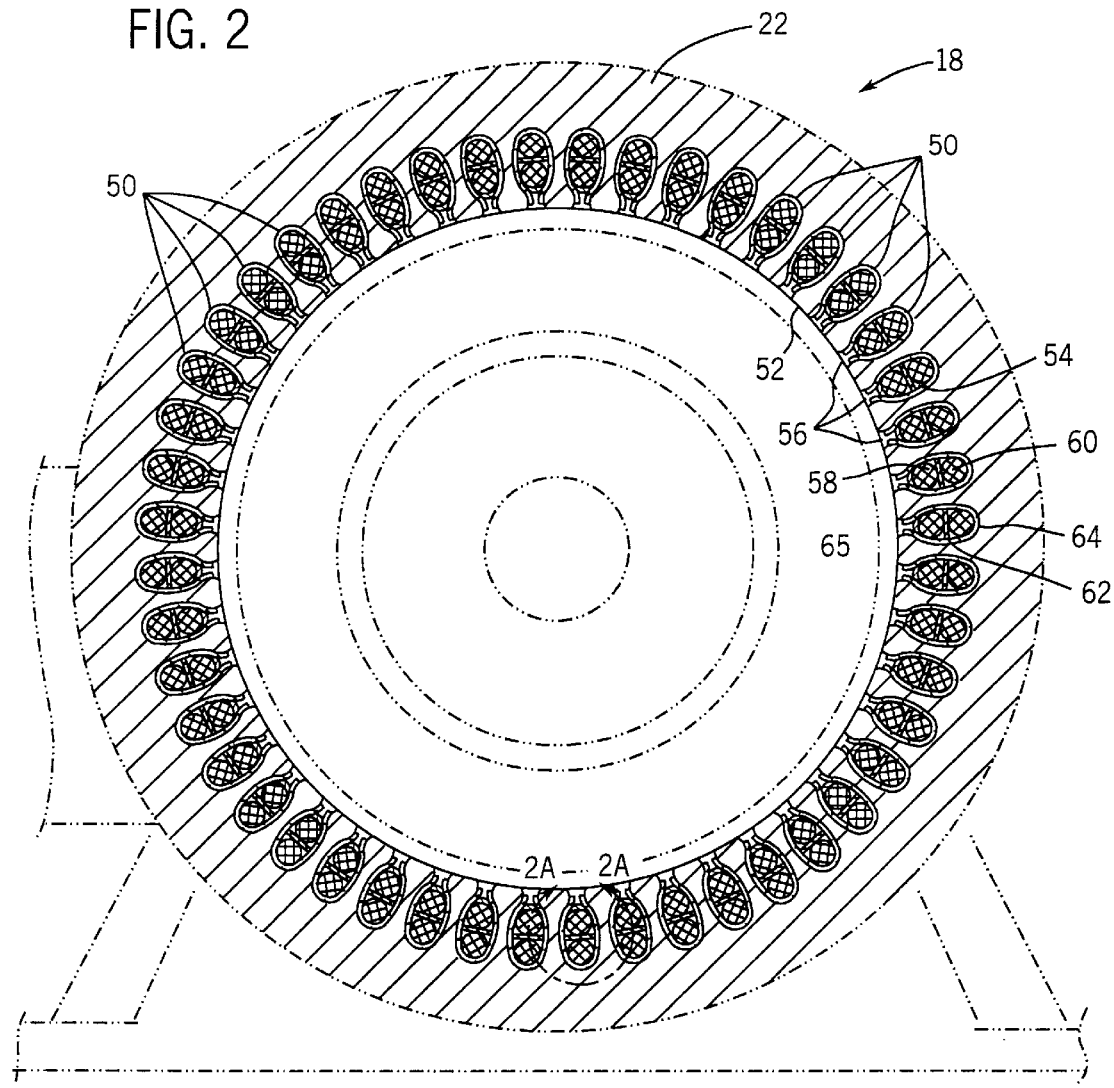
FIG. 2 is a sectional view along line 2—2 of FIG. 1, illustrating an exemplary stator of the electric motor and the manner in which stator coils are disposed in parallel slots formed in the stator core.
Figure 2A:
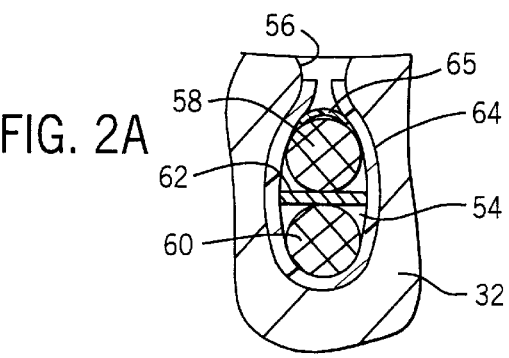
FIG. 2A is a detail view of a slot of the stator shown in FIG. 2, illustrating in greater detail the position of stator coils and insulating elements within the slot.

Referring more particularly now to the configuration of stator assembly 18, FIG. 2 represents a sectioned stator core 22 in which a plurality of stator windings 28 are disposed. In the illustrated embodiment, stator core 22 includes 48 slots, each designated by the reference numeral 50, extending in a longitudinal direction about an inner periphery 52 thereof. As will be appreciated by those skilled in the art, stator assembly 18 may include more or fewer slots and windings, depending upon the power to be applied to motor 10 and the desired speed of the motor, among other considerations. As best illustrated in FIG. 2A, each slot 50 forms an enlarged chamber 54 within stator core 22, open to inner periphery 52 via a narrow elongated opening 56. Within each slot 50, a pair of stator coils are disposed, including an upper position coil 58 and a lower position coil 60. As described below, each coil within stator assembly 18 is positioned within a first slot in a lower position, and within a second, non-adjacent slot in an upper position. Accordingly, as illustrated in FIG. 2, 96 coil sections are visible (2 times 48), each of the 48 coils being disposed within a pair of slots in upper and lower positions.

Referring again to FIG. 2A, within each slot 50, upper position coil 58 is insulated from lower position coil 60 by an insulating member 62. Moreover, both upper and lower position coils 58 and 60 are electrically insulated from stator core 22 by a peripheral insulation layer 64, which may be made of a conventional sheet-type insulation material of a type well known in the art. An inner insulating and retaining member 65 is provided radially inboard of the coils adjacent to the opening in each slot 50. With the coils and insulating elements in place within slots 50, stator assembly 18 is varnished to bond and provide environmental protection to wires comprising each coil from one another. Stator assembly 18 is also honed to provide a uniform and properly dimensioned inner periphery 52 within which rotor assembly 20 can be inserted during assembly of the motor.

As will be appreciated by those skilled in the art, each coil within stator assembly 18 is a closed loop consisting of a plurality of turns of conductive wire, and terminating in a pair of leads. The leads of each coil are coupled to those of other coils within the stator to define groups of coils. The particular size and type of wire used to form the stator coils will generally depend upon the size and design of motor 10. Similarly, the dimensions and shape of slots 50 may be modified from that shown in accordance with the specific design of motor 10. In general, however, the stator coils may be interconnected electrically in various configurations as illustrated in FIGS. 3A, 3B and 3C.

Figure 3A:
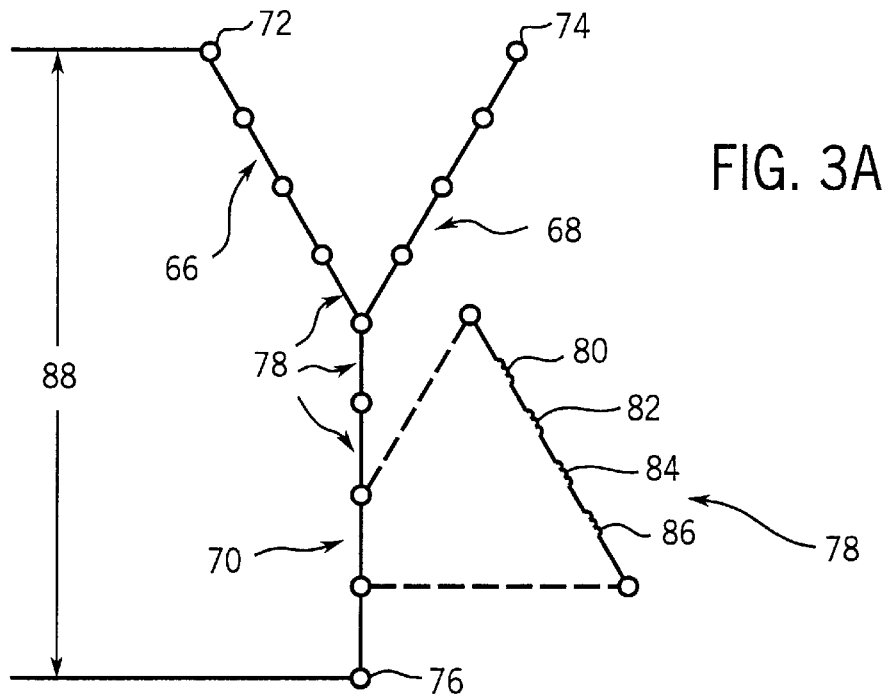
FIGS. 3A, 3B and 3C are diagrammatical representations of stator coils for an electric motor of the type illustrated in FIGS. 1 and 2, interconnected in different electrical configurations.

As shown in FIG. 3A, the stator coils may be interconnected to define a wye configuration consisting of three sets of phase windings, namely an A phase 66, a B phase 68 and a C phase 70, joined at a central junction point. Each phase winding 66, 68 and 70, terminates at a corresponding terminal lead 72, 74 and 76, respectively. As will be recognized by those skilled in the art, in the embodiment illustrated in FIG. 2, 48 coils of stator assembly 18 may be interconnected to obtain the wye arrangement of FIG. 3A by grouping the windings into 12 groups, designated generally by the reference numeral 78. Each group 78 of coils will then consist of four individual coils interconnected either in parallel, or as shown in FIG. 3A, in series. Thus, each group 78 will include a first coil 80, second coil 82, a third coil 84 and a fourth coil 86.

In the wye configuration illustrated in FIG. 3A, when voltage is applied to terminals 72, 74 and 76 for driving the motor, a phase-to-phase potential difference, designated 88 in FIG. 3A, will be developed between terminals 72, 74 and 76. The wave form, and thus the amplitude, of the phase-to-phase voltage may vary depending upon the manner in which the motor is driven. For example, where the stator coils are interconnected to form a 4-pole, 3-phase machine having 12 groups of 4 coils, as shown in FIG. 3A, and the coils are energized by a conventional sinusoidal voltage output wave form, each coil 80 through 86, will experience an RMS voltage drop of up to line voltage divided by 1.732, divided by 16.

Figure 3B:
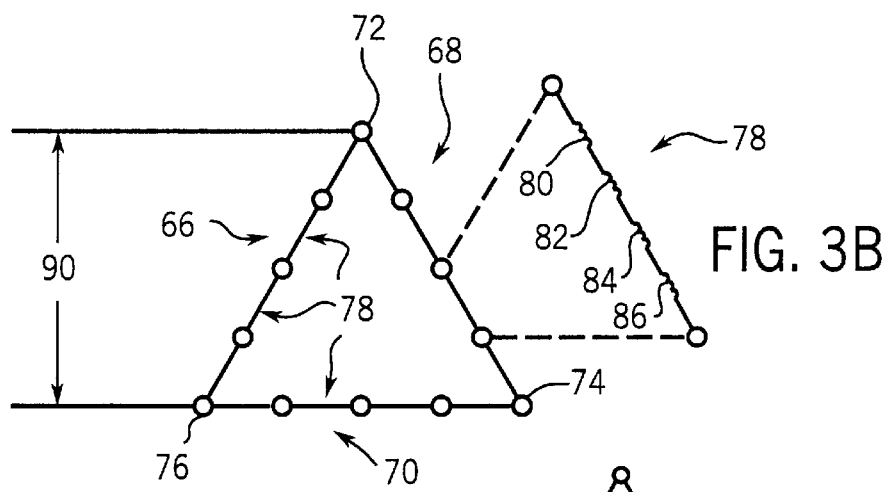
Figure 3C:
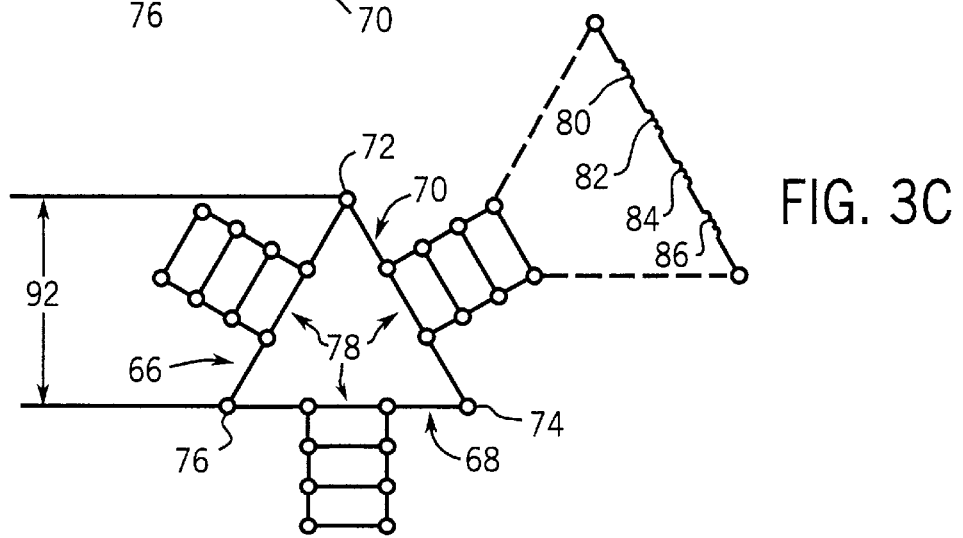

FIG. 3B represents an alternative configuration for interconnecting groups 78 of stator coils in a delta-wound machine. In this configuration, groups 78, each comprising four coils 80, 82, 84 and 86, are again interconnected to form A, B and C phase windings 66, 68 and 70. However, each phase winding is interconnected at terminals 72, 74 and 76 to define a delta configuration. As will be appreciated by those skilled in the art, when the same coils are energized by the sinusoidal voltage mentioned above, individual coils of each phase winding configured as illustrated in FIG. 3B experience a voltage drop which will attain amplitudes equal to 1.732 times those experienced by each coil of the arrangement of FIG. 3A, or equal to the phase-to-phase voltage 90, divided by 16.

FIG. 3C represents a further alternative configuration for interconnecting the stator coils of motor 10. In this arrangement, groups 78 of coils 80, 82, 84, and 86, are defined by interconnecting the coils in series. The groups 78 of coils are interconnected in parallel to form phase windings 66, 68 and 70. The phase windings are then interconnected at terminals 72, 74 and 76 to define the delta configuration shown. When voltage is applied to the terminals by the same inverter drive, a voltage drop will be experienced by each coil group, the amplitude of which can attain the full amplitude of the phase-to-phase voltage 92. Thus, when the parallel-connected coil groups 78 as shown in FIG. 3C are energized by an inverter drive having a direct current bus voltage of approximately 650 volts, each coil will transitorily experience this full voltage drop. Moreover, due to the switching sequence implemented by such drives, potential differences between certain coils within windings 66, 68 and 70 can reach peak levels as high as 3 times this bus voltage, or 1,950 volts, due in part to a reflected wave phenomena. As summarized below, it has been found that heretofore known stator coil designs may lead to failure of insulation under such conditions, while coils and stators in accordance with the present technique significantly limit the voltage gradients established during operation.

Figure 4:
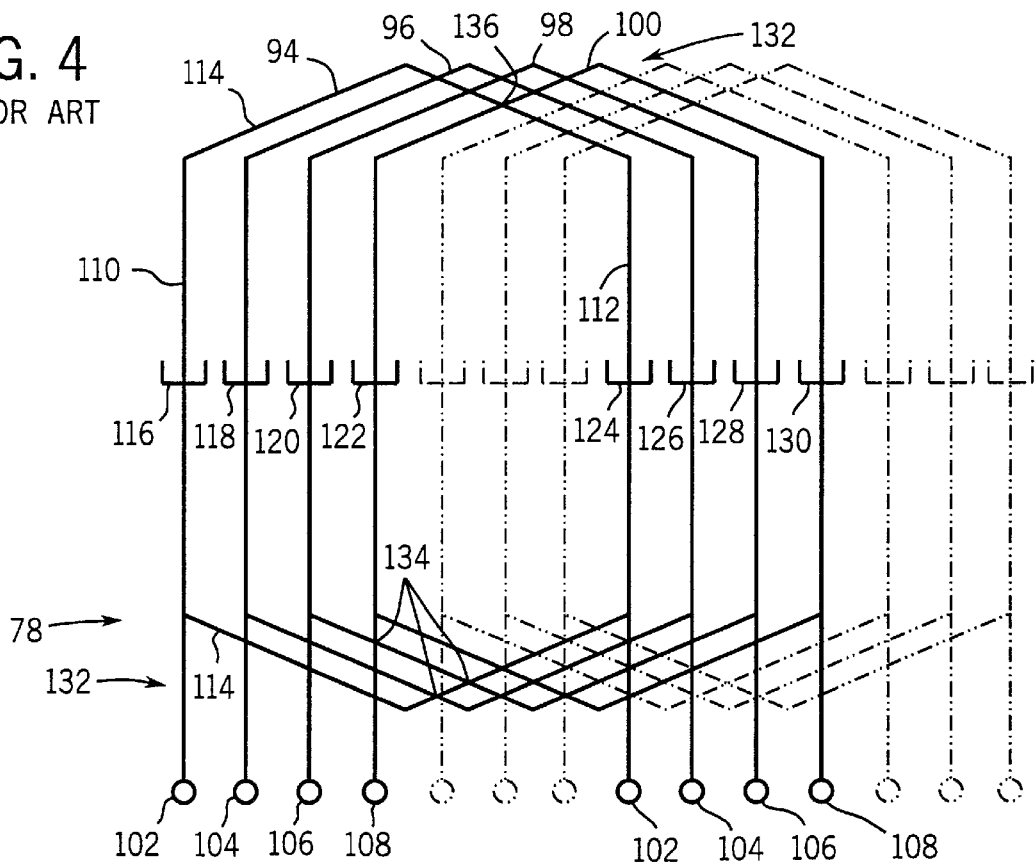
FIG. 4 is a diagrammatical view of a series of conventional stator coils of a group disposed in slots in a stator core and overlapped at an end of the stator core.

FIG. 4 illustrates a group of conventional stator coils which may be electrically interconnected as illustrated in FIGS. 3A, 3B and 3C, but with significant risk of corona breakdown owing to the large potential differences between closely spaced coils. FIG. 4 illustrates diagrammatically four coils 94, 96, 98, and 100 of conventional design, disposed within slots during assembly of a conventional stator. Each coil is comprised of a plurality of turns of wire terminating in leads 102, 104, 106 and 108, respectively. Moreover, each coil has a generally hexagonal or elongated diamond shape, including elongated sides 110 and 112, interconnected by end portions 114. Each side 110 and 112 of the coils is disposed in a stator slot. Thus, first sides 110 of coils 94, 96, 98 and 100 are disposed within adjacent slots 116, 118, 120 and 122, respectively. As mentioned above, in a typical stator, sides 110 will be disposed in a predetermined position, such as a bottom position within each slot. Opposite sides 112 of each coil are disposed in a second series of slots 124, 126, 128 and 130 spaced from the first series of slots from a plurality of intermediate slots. It should be noted that, while a series of three intermediate slots are illustrated in FIG. 4, those skilled in the art will recognize that the actual number of intermediate slots spanned by coils 94, 96, 98 and 100 may vary depending upon the desired electrical configuration of the stator. It should also be noted that where first sides 110 of the coils are disposed in a lower position within their respective slots, second sides 112 will be disposed in an upper position within their respective slots. However, additional coils within each slot have not been illustrated in FIG. 4 for the sake of clarity.

As mentioned above, coils 94, 96, 98 and 100 may be electrically interconnected to form a group of coils either in series or in parallel, as shown in FIGS. 3A, 3B and 3C. Moreover, end portions 124 of each coil will cross one another at end regions 132 in a plurality of crossing points 134. In practice, coils crossing one another at end regions 132 are typically pressed into a bundle in which windings of different coils lie adjacent to one another in a somewhat random manner. As will be appreciated by those skilled in the art, the potential difference between individual coils at each crossing point will vary depending upon the manner in which the coils are interconnected and the electrical configuration of groups of coils within the stator. However, at certain locations within end regions 134, extremely high potential differences can be experienced by adjacent coils, as indicated particularly at reference numeral 136. For example, as discussed above, in delta-wound stators having groups of parallel-connected coils, discussed above with reference to FIG. 3C, potential differences between adjacent coils within end regions 132 may reach levels capable of producing corona ionization which can break down insulation between the coils and result in motor failure.

Figure 5:
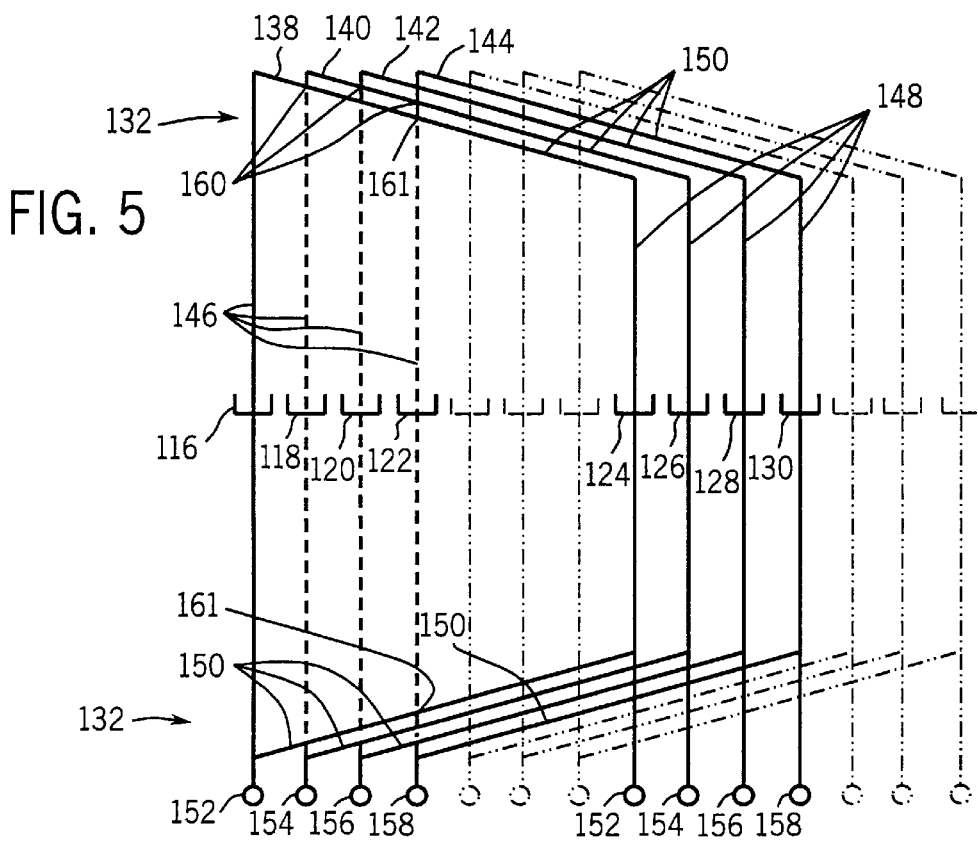
FIG. 5 is a diagrammatical view of a series of stator coils in accordance with the present technique disposed in stator core slots to form a group.

FIG. 5 represents diagrammatically a preferred configuration for stator winding coils designed to avoid such harmful levels of differential voltage in accordance with the present technique. As shown in FIG. 5, each stator coil, designated 138, 140, 142 and 144, is formed of a plurality of turns of conductive wire shaped in a generally trapezoidal configuration. Thus, each coil has a long side 146, a short side 148 and end portions 150, extending therebetween. Each coil terminates in leads 152, 154, 156 and 158, respectively. Long sides 146 of coils 138, 140, 142 and 144 are disposed within adjacent slots 116, 118, 120 and 122, respectively, while short sides 148 are disposed, in a similar order, in a second series of slots 124, 126, 128 and 130, respectively. Each trapezoidal shaped coil 138, 140, 142 and 144 is installed within the respective slots such that long sides 146 are located in a first predetermined position within their respective slots, such as in a lower position, while short sides 148 of each coil are located in an opposite position within their respective slots, such as an upper position. Additional trapezoidal shaped coils within each respective slot are not illustrated in FIG. 5 for the sake of clarity. As will be appreciated by those skilled in the art, however, each slot 116–130, as well as additional slots about the entire inner periphery of the stator core, will have one long side 146 of a trapezoidal shaped coil installed in a predetermined position therein, and one short side 148 of a different coil installed therein. As illustrated above in FIGS. 2 and 2A then, within each slot a long sides 146 of a first coil is separated from a short side 148 of a different coil by an insulating member 162. Moreover, both coils are separated from the stator core material by a sheet insulating material 64.

As will be noted in FIG. 5, by virtue of the trapezoidal shape defined by long sides 146, short sides 148 and end portions 150 of coils 138, 140, 142 and 144, long sides 144 establish a maximum extension for the coils within end regions 132. From the point of maximum extension within the end regions, end portions 150 slope inwardly toward short sides 148 of the respective coils. Short sides 148 similarly define minimum extensions of the coils within end regions 132. By virtue of this geometry, the long side 146 of each coil crosses end portions 150 of the adjacent coil in a predetermined crossing point location 160. From these crossing points, end portions 150 continue to slope toward the short side 148 of each respective coil, crossing subsequent coils again in predetermined positions.

It has been found that the foregoing geometry and layout provides physical spacing between coils in the stator coil groups sufficient to prevent extremely high potential difference gradients, even in inverter drive applications. For example, as shown in FIG. 5, end portion 150 of first coil 138 crosses long side 146 of coil 140 in a first crossing point 160. Each subsequent coil crosses the immediately preceding coil in a similarly placed crossing point. However, each end portion 150 is routed axially outboard (i.e., upwardly and downwardly in FIG. 5) the end portion for the immediately preceding coil in the group. Because potential differences between immediately adjacent coils in each group will typically be lower than the maximum potential difference within the group, the maintenance of spacing and orientation as illustrated in FIG. 5 reduces the potential difference gradients in the end regions and, consequently the risk of corona ionization and subsequent insulation breakdown. Moreover, where particularly high potential differences may exist within the group, such as at a crossing point between a first coil 138 and a fourth coil 144, indicated by reference numeral 161 in FIG. 5, either the end portion 150 of coil 138 or, in a presently preferred embodiment long side 146 of coil 144, is taped to electrically insulate the coils from one another. Again, it should be noted that unlike coil crossing points in present stator constructions, the location of crossing point 161 is predictable within each end region 132 due to the preferred shape and layout of the coils.

FIG. 6 illustrates a physical end view of the foregoing structure. In particular, as shown in FIG. 6, long side 146 of trapezoidal shaped coils 138, 140, 142 and 144 are disposed in upper positions within respective slots 116, 118, 120 and 122. Long sides 146 of each coil exit from the respective slots, and are routed radially outwardly along end 24 of stator core 22. Each long side then joins its respective end portion 150. Each end portion 150 is routed radially outwardly of the long side 146 of the next adjacent coil. Short sides 148 of the coils are disposed in lower positions within slots 124, 126, 128 and 130, respectively. Because end portions 150 are inclined from long sides 146 to short sides 148, after passing behind the long side of an adjacent coil, end portions 150 are generally stacked as they wrap arcuately around end 24 toward the slots in which their short sides are disposed. It should be noted that while a single end 24 is illustrated in FIG. 6, coils 138, 140, 142 and 144 are disposed in a similar manner at the opposite end of the stator core.

FIG. 7 shows a detail plan view of a portion of the arrangement illustrated in FIG. 6. As shown in FIG. 7, long sides 146 of coils 138, 140, 142 and 144 exit their respective slots 116, 118, 120 and 122, to join their respective end portions 150. Each end portion 150 crosses behind the long side 146 of an immediately adjacent coil, and inclines toward its short side (not shown in FIG. 7). End portions 150 are generally stacked axially as they wrap around end 24 of stator core 22. Crossing points 160 are established in locations where long sides 146 of the coils cross end portions 150. One particular crossing point, as indicated at reference numeral 161 will exist at a location where first coil 138 crosses fourth coil 144. Because in certain applications, particularly high potential differences may exist between these two coils of the group, the coils may be insulated from one another at such crossing points by insulating tape. In the presently preferred embodiment, long sides 146 of the trapezoidal shaped coils are taped in regions corresponding to the location of crossing point 161 and, as illustrated in the Figures, may be taped in the location of all crossing points 160. In particular, as shown in FIGS. 7 and 8, a small band of adhesive insulating tape is preferably wound around a region of each long side 146 adjacent to the point where the long side joins end portions 150.

As best illustrated in FIG. 8, the foregoing structure results in a stacked arrangement of coils 138, 140, 142 and 144 within each group which physically distances non-adjacent coils from one another, thereby reducing the potential difference gradient within the end regions of the stator assembly. In the completed stator, coils from other groups (not shown in FIGS. 7 and 8) will be positioned physically within the spaces left between the illustrated coils. Moreover, where high potential differences may exist at crossing points 161, insulating tape 162 effectively insulates the coils from one another.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A stator for an electric motor, the stator comprising:
a generally annular stator core having first and second axial ends and a plurality of circumferentially spaced elongated slots extending between the ends;
a plurality of coils electrically interconnected to form groups of coils, each group including at least four coils, each coil including a plurality of windings forming a loop having a first side of a first length, a second side of a second length longer than the first length, and a pair of end portions extending between the first and second sides, the first and second sides of each coil being disposed in non-adjacent stator core slots, the second side of each coil crossing the end portions of another coil disposed in an adjacent stator core slot in locations axially exterior of the stator core ends, an end portion of each coil in each group being stacked axially outboard of and immediately adjacent to an end portion of another coil in the group, and first and last coils in each group being axially separated and electrically separated from one another at each end of the core by at least one interposed coil of the group, wherein sides of a pair of coils are disposed within each stator core slot and separated from one another by an insulating member and wherein within each stator core slot a first side of a first coil is disposed in a radially outer portion thereof and a second side of a second coil is disposed in a radially inner portion thereof.

2. The stator of claim 1, further comprising insulating elements secured to the second side of each coil adjacent to the end portions thereof, the insulating elements contacting the end portions of another coil disposed in an adjacent stator core slot.

3. The stator of claim 2, wherein the insulating elements include insulating tape wrapped around the coil.

4. The stator of claim 1, wherein each coil includes first and second terminal ends, the first terminal end joining the coil loop at a location adjacent to the first side thereof and the second terminal end joining the coil loop at a location adjacent to the second side thereof.

5. The stator of claim 1, including an insulating element secured to the first coil in each group at a location where the last coil in the respective group crosses the first coil adjacent to the ends of the stator core.

6. The stator of claim 5, wherein the insulting element includes insulating tape wrapped around the first coil in each group.

7. An electric motor comprising:
a housing;
a rotor supported for rotation within the housing, the rotor including an output shaft for transmitting torque; and
a stator disposed within the housing and surrounding the rotor, the stator including a generally annular stator core having first and second axial ends and a plurality of circumferentially spaced elongated slots extending between the ends, and a plurality of coils electrically interconnected to form groups of coils, each group including at least four coils, each coil including a plurality of windings forming a loop having a first side of a first length, a second side of a second length longer than the first length, and a pair of end portions extending between the first and second sides, the first and second sides of each coil being disposed in non-adjacent stator core slots, the second side of each coil crossing end portions of another coil disposed in an adjacent stator core slot in locations axially exterior of the stator core ends, an end portion of each coil in each group being stacked axially outboard of and immediately adjacent to an end portion of another coil in the group, and first and last coils in each group being axially separated and electrically isolated from one another at each end of the core by at least one interposed coil of the group, wherein sides of a pair of coils are disposed within each stator core slot and separated from one another by an insulating member and wherein within each stator core slot a first side of a first coil is disposed in a radially outer portion thereof and second side of a second coil is disposed in a radially inner portion thereof.

8. The electric motor of claim 7, further comprising insulating elements secured to the second side of each stator coil adjacent to the end portions thereof, the insulating elements contacting the end portions of another coil disposed in an adjacent stator core slot.

9. The electric motor of claim 7, wherein each coil includes first and second terminal ends, the first terminal end joining the coil loop at a location adjacent to the first side thereof and the second terminal end joining the coil loop at a location adjacent to the second side thereof.

10. The electric motor of claim 7, including an insulating element secured to the first coil in each group at a location where the last coil in the respective group crosses the first coil adjacent to the ends of the stator core.

11. The electric motor of claim 10, wherein the insulting element includes insulating tape wrapped around the first coil in each group.

12. A method for forming an electric motor stator comprising the steps of:

(a) providing a generally annular stator core having a pair of ends and a plurality of circumferentially spaced elongated slots extending between the ends;

(b) forming a plurality of stator coils, each coil comprising a plurality of windings and a pair of terminal ends to form a generally trapezoidal loop having a short side, a long side and a pair of end portions extending therebetween;

(c) placing the coils in the core slots such that the short side of a first coil is disposed in a first region of each slot and the long side of a second coil is disposed in a second region of each slot, wherein a long and a short side of first and second coils being disposed in each slot, and wherein the long sides of the coils extend beyond the core ends by a greater distance than the short sides of the coils such that each long side crosses end portions of at least one adjacent coil and a portion of each coil between the long and short sides thereof is stacked axially outboard of and contacting an immediately adjacent coil, and wherein the short side of a coil is disposed in a radially outer region of each slot and a long side of a coil is disposed in a radially inner region of each slot; and (d) interconnecting terminal ends of the coils to form groups of coils, each group of coils including at least four coils, the coils being grouped such that a first coil in each group is axially separated and electrically isolated at each end of the core from a last coil in each group by at least one interposed coil.

13. The method of claim 12, comprising the further step of insulating the long side at least a portion of the coils at locations where the long sides cross the end portions of the at least one adjacent coil.

14. The method of claim 13, wherein the insulting step includes wrapping the locations with an insulating tape.

15. The method of claim 13, wherein the insulating step is performed prior to installation of the coils in the stator core.

16. The method of claim 12, comprising the further step of placing an elongated insulating member between portions of the first and second coils disposed in each slot.

17. The method of claim 12, comprising the further step of insulating a portion of the first coil of each group at a location where the first coil of the respective group crosses the last coil of the same group.

18. The method of claim 17, wherein the step of insulating includes wrapping the first coil with insulating tape.

* * * * *